3,370,376
FISH BAIT FLOAT MEANS
George L. Winn, 1677 Beard, Memphis, Tenn. 38112
Filed Feb. 23, 1966, Ser. No. 529,431
7 Claims. (Cl. 43—44.88)

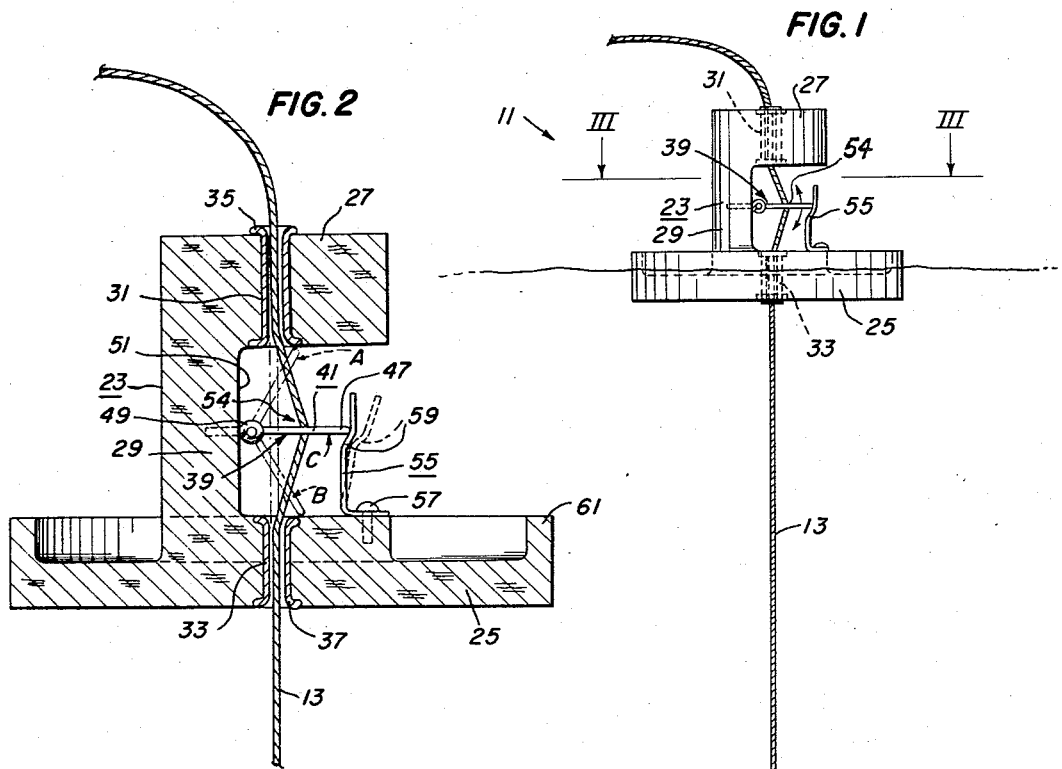

The present invention relates to a fish bait float device adapted to be used with the typical bait casting outfit or for pole fishing.

A primary object of the present invention is to provide a fish bait float device for accurate bait casting or for accurate placement of the bait in a particular spot from the fisherman.

A further object is to provide a bait float device which permits the fisherman to gauge approximately the depth of the bait from the bottom of the lake or fishing reservoir.

A further object is to provide bait float means whereby the fisherman by pulling on the fishing line may raise the bait to a desired level and to fish at a desired depth.

A further object is to provide bait float means for permitting the cast bait to drift downwardly in the water substantially vertically and in such a manner as not to snag or brush or plant growth in the water.

A further object is to provide bait float means which causes the bait to be raised vertically as the bait and float device are retrieved by the fisherman and which causes the bait to float along the surface of the water as it is being retrieved and in such a manner as not to catch on brush or plant growth in the water.

A further object is generally to improve the design and construction of fish bait float devices.

The means by which the foregoing and other objects of the present invention are accomplished and the manner of their accomplishment will be readily understood from the following specification upon reference to the accompanying drawings, in which:

FIG. 1 is an elevational view of the bait float device of the present invention shown operatively secured to and in conjunction with a fishing line and with bait means attached to the end of the line.

FIG. 2 is an enlarged vertical plane sectional view taken as on the vertical axis of the device positioned as illustrated in FIG. 1.

FIG. 3 is an enlarged horizontal plane sectional view taken as on the line III—III of FIG. 1.

Referring now to the drawings in which the various parts are indicated by numerals, the fish bait float device is indicated by numeral 11 and is illustrated attached to fishing line 13 adjacent the free end thereof. Fish bait means, indicated 15, is attached adjacent the end of the line. A typical form of fish bait means is illustrated and includes a fish hook 17, a lead sinker 19, and fish bait material 21 impaled on the fish hook.

Fish bait float device 11 includes a body 23 preferably formed of cork material and includes a disc shaped base portion 25, a cylindrical top portion 27, and a semi-cylindrical medial portion 29 integrally securing the base and top portions together. Upper and lower tubular guide members 31, 33 are secured respectively in the top and base portions of body 23. Tubular members 31, 33 are preferably coaxially aligned and disposed along the vertical axis of the device. The fishing line is guidably received respectively in the follow core interiors of upper and lower guide members 31, 33. The oppositely disposed end portions respectively of tubular guide members 31, 33 are preferably flared to provide flared end portions 35, 37. Fishing line 13 is freely movable upwardly or downwardly in upper and lower guide means 31, 33.

A pawl member 39 is pivotally supported from medial portion 29 of body 23 and is pivotable about a horizontal axis. Pawl member 39 preferably is formed of wire stock and includes an intermediately disposed main portion 41 and a pair of oppositely disposed bearing portions 43. Main portion 41 is preferably in the form of a double bent wire portion and includes a pair of converging check portions 45 and a distal end portion 47. Eye-formed bearing members 49 pivotally support pawl member 39 from medial portion 29 of body 23; parallel spaced bearing members 49 journal respectively the oppositely extending bearing portions 43 of the pawl member along inward side surface 51 of float body 23. The double bent main portion 41 of pawl member 39 forms a tear drop shaped opening 53. Fishing line 13 extends through opening 53 and is in substantially continuous engagement with the pair of converging check portions 45. Pawl member 39 is adapted to be pivotally moved upwardly or downwardly to an up or down position upon upward or downward movement of the fishing line or to an intermediate position substantially midway between the up and down positions.

The up, down and intermediate positions are indicated A, B and C, respectively. In FIG. 2, the pawl member is arranged in intermediate position C and up position A and down position B are indicated respectively by broken lines. When pawl member main portion 41 is in up position, the fishing line is free to move upwardly in pawl opening 53 and between check portions 45, but the instant the fishing line movement is reversed and moved downwardly, the pawl is moved downwardly or toward an intermediate position. By the same token, when pawl member 39 is in a down position, the fishing line is free to move downwardly, but the instant the movement is reversed upwardly, the main portion of the pawl is firmly moved toward an up or intermediate position. It will be understood that the reason for the above action is that when the pawl member 39 and main portion 41 are in an intermediate horizontal position, check portions 45 establish frictional engagement means for the fishing line 13, which is offset relative to an imaginary straight line extending between guide members 31, 33. In other words, due to the converging of check portions 45 the distance between the check portions narrows down to a place where it is less than the diameter of the line 13 and the fishing line 13 is frictionally wedged therebetween. The above-mentioned narrowed place is offset relative to the above-mentioned imaginary line so that the wedging can occur. This place is shown as at 54 in FIGS. 1 and 2, and it will be noted that the line 13 when adjacent this place is also offset from said imaginary line. In addition, it will be understood that when pawl member 39 is moved into said up and down positions the place at 54 will be moved towards alignment with said imaginary line so that the wedging action no longer takes place and the line 13 can move relative to pawl member 39.

A spring member 55 is intermittently engageable with pawl member 39 for yieldably holding the pawl member against downward movement and in intermediate position C. Spring member 55 is preferably formed of thin, flat spring stock and fixedly secured by headed fastener 57 to float body base portion 25. Spring member 55 includes an inwardly curved portion 59 disposed adjacent the upper end of the spring member. The spring member is somewhat tangentially arranged relative to the imaginary arc defined by the pivotal movement of the tip or distal end portion 47 of the pawl member. Curved portion 59 of spring member 55 protrudes inwardly inside the arc defined by the distal end portion of the pawl member. The relative arrangement of spring member curved portion 59 and pawl member distal end portion 47 is such that the pawl member when in intermediate position C rests on curved portion 59. When the pawl member is moved from intermediate position C to a down position B, the distal end portion 47 of the pawl member and the curved portion 59 of the spring member act as detent means and a predetermined pull will be exerted downwardly on the fishing line to move the pawl member to a down position. The pawl member is freely movable from intermediate position C to up position A; the distal end portion of the pawl member rests on curved portion 59 of the spring member and the pawl member is freely movable upwardly when fishing line 13 is pulled upwardly. The position of spring member 55, shown in broken lines in FIG. 2, depicts substantially the maximum tensioned position of spring member 55 as pawl member 39 moves downwardly past spring member curved portion 59.

The disc-shaped base portion 25 of bait float body 23 preferably includes an upwardly projecting flange portion 61 extending circumferentially about the float body.

When float device 11 is in the water, and pawl member main portion 41 is in intermediate position C, the weight of the bait or sinker, or the weight of fish bait means 15 is supported at a certain level in the water. When pawl member main portion 41 moves downwardly past spring member curved portion 59 and to down position B, fish bait means 15 is free to move downwardly under the force of gravity. When pawl member main portion 41 is in up position A, the fishing line may be moved upwardly and toward the fisherman.

The operation of the bait float device in use is briefly as follows: When the bait float device is being cast by the fisherman, fish bait means 15 is adjacent or against the underside of float body base portion 25 and pawl member 39 is in position A. When float body base portion 25 strikes the water, lead sinker 19 and fish bait means 15 will continue forward in the water and cause pawl member main portion 41 to move past spring member curved portion 59 and the pawl member to move to down position B. In this position the bait means will sink to the bottom of the lake or fishing reservoir. The fisherman may then pull the line a desired distance level in the water and in so doing, move pawl 39 to intermediate position C, which holds line 13 in place. As the fisherman pulls in on the line to raise the fish bait, the circumferentially extending flange portion 61 is adapted to hold or cup into the water and thereby prevent the float device from moving toward the fisherman and away from the desired fishing spot. In retrieving the line and fish bait means, the pawl member main portion is moved to up position A and the float device may be retrieved over the surface of the water with the bait means engaging the under surface of the float device body.

The device of the present invention facilitates accurate bait casting. The depth of the fish bait in the water can be regulated easily by the fisherman; the depth of the fish bait may be readily ascertained by raising the bait a desired distance from the bottom of the fishing reservoir. The bait float device provides means whereby the bait may be retrieved over the surface of the water without snagging the bait on plant growth or brush in the water.

Although the present invention has been described with reference to a preferred embodiment thereof, it is not to be so limited since changes and modifications may be made therein which are within the full intended scope of this invention as hereinafter claimed.

I claim:

1. In a fish-catching outfit including a fishing line and fish bait means attached to said line adjacent the free end thereof, fish bait float means for use in manipulating the fish bait means comprising a body with at least a part of said body constituting means for buoyantly supporting said fish bait float means on a fishing reservoir water surface, upper and lower guide means supported from said body for guiding said fishing line with said line extending between and freely movable upwardly or downwardly in said upper and lower guide means, a pawl member pivotally supported from said body with the pivot axis thereof extending horizontally and spaced from an imaginary straight line extending between said upper and lower guide means, said pawl member including at least one check portion substantially in continuous engagement with said fishing line, said pawl member being adapted to be pivotally moved upwardly or downwardly to an up or down position upon upward or downward movement of said fishing line or moved to an intermediate position substantially midway between said up and down positions, detent means supported from said body and intermittently engageable with said pawl member for yieldably holding said pawl member against downward movement and in said intermediate position; when in said intermediate position, said pawl member extending substantially horizontally with said check portion thereof firmly engaging and urging said fishing line to an offset position relative to an imaginary straight line extending between said upper and lower guide means; and when in said intermediate position, said pawl member being freely movable to said up position upon an upward pull on said fishing line or yieldably movable downwardly and out of engagement with said detent means upon a downward pull on said fishing line.

2. The fish bait float means of claim 1 further characterized in that said upper and lower guide means are in the form of upper and lower tubular guide members and said fishing line is guidably received in the hollow core interiors respectively of said upper and lower guide members.

3. The fish bait float means of claim 1 further characterized in that said pawl member includes a converging pair of check portions converging substantially towards the pivot axis of said pawl member and with said fishing line being operatively received between and in substantially continuous engagement with said check portions.

4. The fish bait float means of claim 1 further characterized in that said detent means includes an elongated spring member tangentially arranged relative to the imaginary arc defined by the pivotal movement of said pawl member.

5. The fish bait float means of claim 1 further characterized in that said pawl member is elongated and includes a distal end portion remote from the pivot axis of said pawl member and additionally, that said detent means includes an elongated spring member tangentially arranged relative to and intermittently engageable with said distal end portion of said pawl member.

6. Fish bait float means for use with a fishing line and fish bait means attached to said line, said fish bait float means comprising a body including means for buoyantly supporting said fish bait float means in water, guide means supported by said body for normally guiding said fishing line along an imaginary line, a pawl member pivotally mounted on said body on a substantially horizontal axis between upper and lower positions and including friction means for frictionally engaging said fishing line at a place offset from said imaginary line when said pawl member is in an intermediate position between said upper and lower positions, means pivotally mounting said pawl member on said body for pivot of said pawl member by said fishing line between said upper and lower positions relative to said intermediate position to carry said friction means out of engagement with said fishing line and permit slippage of said fishing line relative to said pawl member, and means attached to said body for releasably holding said pawl member in said intermediate position.

7. The fish bait float means of claim 6 in which said friction means comprises a pair of converging check portions.

References Cited
UNITED STATES PATENTS

| | | | |
|---|---|---|---|
| 250,848 | 12/1881 | Smith | 43—44.88 |
| 992,341 | 5/1911 | Davis | 43—44.88 |
| 2,326,510 | 8/1943 | Worden | 43—44.88 |
| 2,722,768 | 11/1955 | Fleetwood | 44—44.91 |

SAMUEL KOREN, *Primary Examiner.*

D. J. LEACH, *Assistant Examiner.*